United States Patent
Shver et al.

(10) Patent No.: US 10,989,475 B2
(45) Date of Patent: Apr. 27, 2021

(54) SYSTEMS AND METHODS TO PREHEAT FERROMAGNETIC SCRAP

(71) Applicants: Valery Shver, Alpharetta, GA (US); Jaroslav Brhel, Zdar nad Sazavou (CZ)

(72) Inventors: Valery Shver, Alpharetta, GA (US); Jaroslav Brhel, Zdar nad Sazavou (CZ)

(73) Assignees: Valery Shver, Alpharetta, GA (US); Jaroslav Brhel, Zdar nad Sazavou (CZ)

( * ) Notice: Subject to any disclaimer, the term of this patent is extended or adjusted under 35 U.S.C. 154(b) by 450 days.

(21) Appl. No.: 15/850,490

(22) Filed: Dec. 21, 2017

(65) Prior Publication Data
US 2018/0180358 A1 Jun. 28, 2018

Related U.S. Application Data

(60) Provisional application No. 62/437,895, filed on Dec. 22, 2016.

(51) Int. Cl.
*F27D 13/00* (2006.01)
*C21C 5/52* (2006.01)
(Continued)

(52) U.S. Cl.
CPC ........... *F27D 13/002* (2013.01); *C21C 5/527* (2013.01); *F27B 3/186* (2013.01); *F27B 3/263* (2013.01);
(Continued)

(58) Field of Classification Search
CPC ........ C21C 2005/5282; C21C 2200/00; C21C 5/527; F27D 11/08; F27D 13/002; H05B 7/20; F27B 3/186; F27B 3/263
(Continued)

(56) References Cited

U.S. PATENT DOCUMENTS 7,494,079 B1 * 2/2009 Siracusa ............... B02C 21/00
 241/65
7,697,253 B1 4/2010 Maraval
(Continued)

FOREIGN PATENT DOCUMENTS

EP 0095793 B1 9/1985
EP 2781867 A1 9/2014
(Continued)

OTHER PUBLICATIONS

European Search Report dated Apr. 2, 2020 issued in European Application No. 17883048.5.

*Primary Examiner* — Dana Ross
*Assistant Examiner* — Joseph W Iskra
(74) *Attorney, Agent, or Firm* — Troutman Pepper Hamilton Sanders LLP; James E. Schutz; Micah B. Hensley

(57) ABSTRACT

An example embodiment of the present invention provides a system for preheating ferromagnetic scrap. The system can include a preheating unit that is configured to hold ferromagnetic scrap and to receive hot gases. The preheating unit may include a removable cover that can include an electrical magnet system. The electrical magnet system can comprise an electrical magnet, a lifting device configured to lower and raise the electrical magnet, a power system configured to provide electrical power to the electrical magnet, and an electrical control system configured to operate the magnet. A hot gases cleaning system may be fluidly connected to the preheating unit.

24 Claims, 10 Drawing Sheets

(51) Int. Cl.
    *F27B 3/18* (2006.01)
    *F27B 3/26* (2006.01)
    *F27D 11/08* (2006.01)
    *H05B 7/20* (2006.01)
(52) U.S. Cl.
    CPC ............... *F27D 11/08* (2013.01); *H05B 7/20* (2013.01); *C21C 2005/5282* (2013.01); *C21C 2200/00* (2013.01)
(58) Field of Classification Search
    USPC .......................................................... 373/80
    See application file for complete search history.

(56) References Cited

U.S. PATENT DOCUMENTS

| | | | |
|---|---|---|---|
| 8,807,344 B2 * | 8/2014 | Keaton | ................. B03C 1/0332 209/214 |
| 2013/0042722 A1 * | 2/2013 | Kruglick | ................... C22B 7/02 75/751 |
| 2013/0240415 A1 * | 9/2013 | Keaton | ..................... B22F 9/04 209/38 |

FOREIGN PATENT DOCUMENTS

| | | | |
|---|---|---|---|
| FR | 2681937 | A3 | 4/1993 |
| JP | 07286785 | A | 10/1995 |
| JP | H07286785 | * | 10/1995 |
| WO | 2014027332 | A1 | 2/2014 |
| WO | WO2014027332 | * | 2/2014 |
| WO | 2014146853 | A1 | 9/2014 |

* cited by examiner

SYSTEMS AND METHODS TO PREHEAT FERROMAGNETIC SCRAP

CROSS-REFERENCE TO RELATED APPLICATIONS

This application claims the benefit, under 35 U.S.C. § 119(e) of United States Provisional Patent Application No. 62/437,895 filed on 22 Dec. 2016, the entire content and substance of which are incorporated herein by reference as if set forth in their entirety.

BACKGROUND

1. Field of Invention

The present invention relates generally to a method and apparatus that can be used in metal preheating and more particularly to a method and apparatus for preheating ferromagnetic scrap, for example, steel, iron, nickel, cobalt, and their alloys, prior to charging it to a metallurgical furnace or process vessel, such as an Electric Arc Furnace (EAF), reverberatory furnace, melting furnace, rotary furnace, etc.

2. Background of Related Art

There are many different melting processes that use ferromagnetic scrap to produce liquid metal. Scrap is typically preheated inside and outside of melting vessels by using burners, exhaust gases, or a combination of the two. In some instances, like in special types of EAFs, preheating can be done by exhaust gases and burners in the furnace's vertical shaft, which may store the scrap during the melting process. Alternately, the scrap may be stored on a movable cart or other apparatus, preheated by burners or exhaust gases, and moved toward a furnace shell when required. For Consteel type EAFs, the exhaust gases and burners preheating the scrap on the conveyer may continuously deliver scrap to the furnace shell.

Generally, only a relatively low temperature and low efficiency in preheating the scrap is achievable by conventional practices. There are many contributing reasons for this, such as variable gas temperature and the undesirable melting of portions of the scrap during preheating by gases of an overly high temperature. As a result, scrap piles may become agglomerated, making it difficult to charge the scrap into the furnace.

The hot gases used for the scrap preheating may be moved through the scrap piles by forces of natural draft and/or by blowers, which produce negative pressure and force gases out of preheating vessels. Conventionally, it is practically impossible to position the scrap in such way that the hot gases are moved through and uniformly preheat the scrap pile. Instead, the drafted gases move through the paths of least resistance, which is typically along the walls of shafts or above the scrap within conveyer tunnels. As a result, the mean temperature of scrap preheated by different described methods may not exceed 350-450° C., and therefore the energy delivered to the metallurgical process by preheated scrap is relatively low, reaching only about 50-65 kWh/ton.

Due to the low density of hot gases—about 5 times lower at 1,200° C. than air density at 60° C.—these gases always move up and in the direction of drafting during scrap preheating, and only a cover of a preheating unit protects the hot gases from escaping. Thus, the scrap or any other material positioned near the top of a preheating unit will generally be preheated by the hot gases much more efficiently than scrap located at the bottom of the preheating unit.

Therefore, it would be advantageous to increase the amount of energy added to preheated scrap prepared for melting or for other metallurgical processes. It would also be advantageous to preheat scrap more efficiently and without scrap agglomeration.

BRIEF SUMMARY

Example embodiments of the present invention provide a method and apparatus for increasing the energy transferred into ferromagnetic scrap during preheating by hot gases. Scrap can be preheated by exhaust gases, or burners for further processing or melting in the different type of metallurgical furnace or vessel.

Example embodiments of the present invention relate generally to a method and apparatus used for preheating ferromagnetic scrap by hot gases in metal melting processes, and more particularly, to a method and apparatus for preheating scrap in a closed or semi-closed vessel before charging it into a furnace used for metal melting or into vessels used for different metallurgical processes.

BRIEF DESCRIPTION OF THE DRAWINGS

Reference will now be made to the accompanying figures, which are not necessarily drawn to scale, and wherein.

DETAILED DESCRIPTION

Description of Some Industrial Applications

Figure 1:
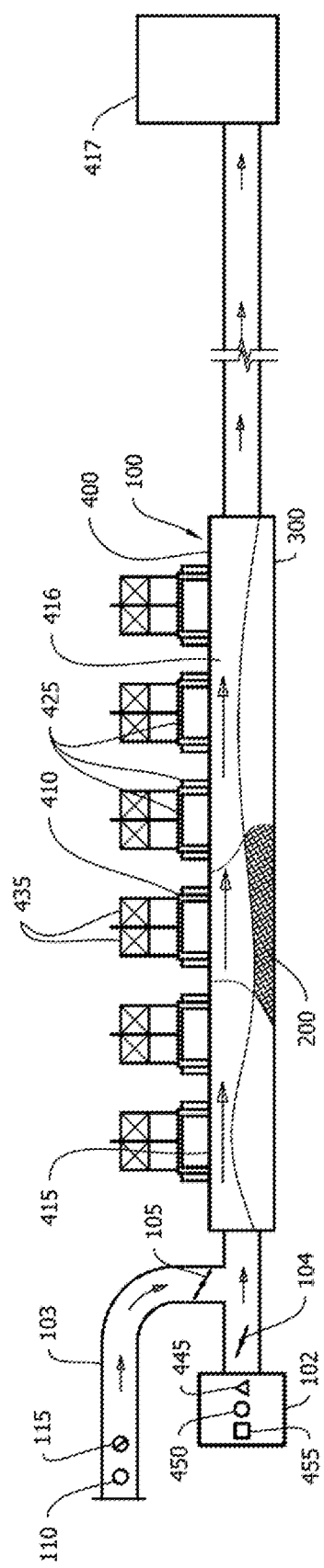
FIG. 1 depicts a side view of a preheating unit for preheating scrap, according to some embodiments of the present invention.

An example embodiment of the present invention can comprise systems for the preheating of ferromagnetic scrap for charging into furnaces or metallurgical vessels continuously or by batch method. In various example embodiments, a plurality of different types of burners or exhaust gases; hot gases, such as a by-product of a metallurgical or chemical process; other available hot gases; or combinations of any of the above can be used to preheat scrap.

To simplify and clarify explanation of current invention, the systems described below can be divided into at least three example cases:

Case 1 describes the preheating of ferromagnetic scrap located in a stationary position within a preheating unit. After preheating, the preheated scrap can be moved, for example, to a melting furnace for further processing. The preheated scrap can then, by different methods or mechanisms, be discharged from the preheating unit directly or indirectly to the processing or melting facility.

Case 2 describes the preheating of ferromagnetic scrap that is being moved in a processing facility or into a melting furnace by a conveyer or similar means.

Case 3 describes the preheating of ferromagnetic scrap that is being moved by a conveyer or similar means, charging preheated scrap into a transition vessel, and subsequently charging the scrap, such as by a batch manner using the transition vessel, into a processing facility or melting furnace.

It should be noted that the materials described hereinafter as making up the various elements of present invention are intended to be illustrative and not restrictive.

In Case 1, scrap positioned in a preheating unit for preheating by hot gases typically cannot be preheated uniformly using current practices. The hot gases entering from one side of the unit and exiting through the opposite side can generally move over the pile of scrap through gaps between the top of the scrap pile and the cover or top of the preheating unit, following a path of least resistance; therefore, preheating is mostly limited to an upper layer of scrap. Hot gases are also capable of moving through the potential gaps between the scrap and the side wall of the preheating unit but with significantly lower volume and, therefore, with much less energy available for preheating. The main heat transfer from the hot gases to the scrap is produced by convection, when high temperature and high velocity gases are in contact with the upper layer of scrap. In the lower layers of the scrap, the heat exchange is provided mostly by conduction, which is a very inefficient method of heat transfer for non-monolithic scrap piles. It thus takes a long time for the lower layers of scrap to receive a reasonable amount of energy. By the time they lower layers are sufficiently heated, portions of the upper layer of scrap can become preheated to approximately the melting temperature of the scrap, which carries the risk of agglomeration. Agglomerated scrap is very difficult to subsequently charge into a furnace or metallurgical vessel and also requires more energy for processing, which reduces any expected energy savings intended by the scrap preheating process. Part of the hot gas energy is also spent in preheating the unit cover and the side walls, and the rest of the gas is moved out of the preheating unit to the gas cleaning system. The mean temperature of the scrap, which indicates the enthalpy of the preheating process, is still relatively low after this type of preheating.

A goal of various embodiments of the present invention is to increase the mean temperature of preheated ferromagnetic scrap and thus increase the amount of energy delivered to the scrap during the limited time available for preheating by current metallurgical practices. An additional goal of various embodiments of the present invention is to reduce the pressure drop of preheating gases travelling through the scrap while maximizing the efficiency of the preheating process. Various embodiments of the present invention may solve this problem by providing an increased surface area of the scrap by raising up a portion of scrap by electromagnetic force. In some embodiments, one or more electrical magnets may be installed in or on the cover of the preheating unit and may be configured to be moved vertically down and up. The magnets may be moved down to a lowered position such that the magnets contact a top portion of the scrap located below the respective magnets, powered to generate magnetic flux, and may produce, for some duration, an electromagnetic holding force sufficient to hold some or all of the scrap located below the respective magnets. While holding at least a portion of the scrap, the magnets may be raised up to maintain at least a portion of the scrap in an upper position, which may provide a gap between the upper and lower portions of scrap, thereby significantly increasing the surface area of the scrap that is available for preheating. As a result, hot gases may be permitted to move through the gap between the upper and lower portions of scrap, transferring an increased amount of energy into the scrap by convection and thus increasing the mean temperature of the scrap. As will be appreciated by those of skill in the art, this process may work only when a sufficient portion of the scrap or material has ferromagnetic properties. Electrical magnets can be operated by DC or AC power and can be cooled by water or other methods to protect them from overheating in the high temperature environment of the preheating unit.

To achieve more uniform preheating, a plurality of magnets can raise the scrap simultaneously, different groups of magnets can raise the scrap sequentially, or a varied pattern of energized and de-energized magnets may be used. Additionally, the holding force of the electrical magnets may be changed at different times during preheating such that the magnets raise a different volume of scrap at different times during preheating. An electrical control system may control operation of the electrical magnets based on information from sensors installed in or on the preheating unit system.

In certain embodiments, the control system can send electrical signals instructing the system, or various components of the system, to increase or decrease the temperature and/or volume of gas introduced into the preheating unit. According to some embodiments, some or all of the scrap preheating process may be automated. In some embodiments, the control system may be configured to automatically control various aspects and/or components of the system according to one or more predetermined factors.

If the temperature of a magnet exceeds the Curie temperature, which is about 1043° K (770° C.) for iron and is approximately the same for ferromagnetic steel, the magnetic holding force would be lost. Thus, this temperature approximates a maximum temperature of preheating ferromagnetic scrap while using magnets and also provides motivation to more uniformly preheat scrap while increasing its mean temperature.

In Case 2, scrap preheating may conventionally occur by transporting scrap via a conveyer directly into a melting furnace, for example into a Consteel EAF. Currently in such operations, scrap is generally preheated by exhaust gases or a combination of exhaust gases and different types of burners, but these methods typically fail to raise the mean temperature of the scrap above 450° C. In contrast, the presently disclosed method may increase the mean temperature of scrap to 700° C., increasing the enthalpy of the scrap to about 48 kWh/ton, which is equivalent to saving approximately 74 kWh/ton of electrical energy.

Current scrap preheating processes, such as those for reverberatory furnaces or Consteel EAFs, may be accomplished on a conveyer delivering scrap directly to a molten bath in the furnace. The preheating portion of the conveyer may be located near the furnace shell and next to a spout for charging scrap into the furnace. The preheating portion may be a tunnel fabricated from steel plates or covered by refractory or water cooled. The scrap preheating, in this case, may be accomplished by providing hot exhaust gases produced during the furnace operation and moved opposite the flow of the scrap through the tunnel toward a gas cleaning system. Typically, the blowers of the scrap cleaning system produce negative pressure required to the hot exhaust gases from the furnace and through the preheating tunnel. In addition to the preheating accomplished by the exhaust gases moving through the tunnel, the tunnel may also be equipped with burners installed in the tunnel's cover and/or walls. Scrap travels through the tunnel for a relatively short time—about 10-20 minutes—and it is thus critical to deliver into the scrap as much energy as possible during that short period.

Problems related with intensive energy introduction into the scrap in Case 2 are the same as those associated with preheating scrap as in Case 1. Hot exhaust gases may move through the scrap preheating tunnel with varying velocity, which may be influenced by the furnace's metallurgical process. As in Case 1, hot exhaust gases may follow the path of least resistance, flowing through the gap between the top of the scrap pile and the bottom of the tunnel's cover. This generally allows only the upper layers of scrap to become efficiently preheated by the hot exhaust gases. Any heat transferred into the lower layers of the scrap is generally provided by conduction, which is typically an inefficient method of heat transfer for non-monolithic scrap piles. Preheating scrap by conduction is typically too inefficient to cause the scrap to reach the desired mean temperature of 650-700° C. within the 10-20 minutes during which the scrap is travelling on the conveyer. In addition, any hot gases provided by burners located within the preheating tunnel may overheat the upper layer of scrap to the point of creating a risk of agglomeration. Should agglomeration occur, several additional difficulties arise related to transporting the scrap via the conveyer and charging it into the furnace through a window in the side wall of the EAF. Melting agglomerated scrap typically requires additional energy, which can reduce any expected energy savings anticipated from the scrap preheating process. Current practices generally struggle, or may be unable, to raise the scrap mean temperature to above 300-450° C.

According to some embodiments, these and other problems may be solved by the installation of one or more electrical magnets above or on top of the preheating tunnel of the conveyer. In some embodiments, a series of magnets can move in the same direction and with the same, or approximately the same, velocity as the scrap that is carried by the scrap conveyer to the furnace charging window. The electrical magnets may have the ability to move vertically down and directly contact the top of the scrap. When the magnets become energized, they generate magnetic flux, and by producing an electromagnetic holding force, the magnets may raise up some portion of the scrap, creating a gap between the resulting upper and lower portions of scrap. The preheating gases can then flow through the gap between the upper and lower portions of scrap, increasing the surface area of scrap exposed to the hot preheating gases, which may greatly increase the ability to preheat the scrap. When a magnet reaches the end of the preheating tunnel, that magnet may become de-energized such that the magnetic field of that magnet becomes disabled, allowing the upper portion of scrap to fall back down on the conveyer to be charged into the furnace opening. In some embodiments, the electrical magnets can operate by DC or AC power and can be cooled by water or other methods to protect them from overheating in the high temperature environment of the preheating tunnel.

In Case 3, certain embodiments of the present invention can preheat ferromagnetic scrap to a high mean temperature on a moving conveyer compatible with conventional EAFs that are designed for batch charging scrap. Scrap can be preheated in the heating tunnel using exhaust gases and a rotating conveyer of electromagnets, and subsequently, the scrap can be charged into a stationary transition vessel and then batch charged into a melting furnace or processing vessel.

Some embodiments of the present invention may include improvements to scrap preheating in batch charging operations, similar to the approaches described above with respect to Case 2. In batch charging operations, scrap is typically loaded into an EAF shell and first charged into a scrap bucket by an overhead crane. Next, another overhead crane generally drops the scrap from the bucket, over the top of the EAF shell, and into a furnace. In certain embodiments, cold scrap can be first charged and preheated by hot gases on a scrap conveyer and can be subsequently charged by the scrap conveyer into a transition vessel. The transition vessel can then charge the preheated scrap into a furnace. To load scrap into a transition vessel after it has been preheated may require additional efforts, including, for example, installation of additional burners to maintain the scrap's mean temperature during any scheduled or unscheduled delays that may occur during the batch charging process. An advantage of using transition vessels in a scrap preheating operation is the ability to increase the mean temperature of the scrap above the Curie temperature after charging it by the conveyer into the vessel since thermal degradation of the electrical magnets is not a concern in the transition vessel. After the scrap has been loaded into the transition vessel, it can be further preheated with the use of exhaust gases and/or additional burners. In some embodiments, the scrap transition vessel may be designed in a way that reduces or minimizes heat loss of the already preheated scrap while it is stored in the vessel and is waiting to be charged into the furnace. Refractory lining, or a number of other methods of insulation, could be used for this purpose.

Example Embodiments

The present disclosure can be understood more readily by reference to the following detailed description of example embodiments and the examples included herein. It is to be understood that embodiments are not limited to those described within this disclosure. Numerous modifications and variations thereof will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth herein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, example embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the invention, for example.

FIGS. 1-5 show different views and sections of example embodiments of a preheating unit for preheating ferromagnetic material, such as scrap, according to certain embodiments related to Case 1, as discussed above.

In some embodiments, an example of which is shown in FIG.1, ferromagnetic scrap 200 may be preheated in a preheating unit 100 by means of combustion gases produced by burners 102 and/or exhaust gases coming through a duct 103 from any metallurgical furnaces or process vessels. The supply of hot gases used for the preheating process may be continuously optimized based on the volume, pressure, and/or temperature of the gases. Optimization may be achieved by operating control valves 104 and 105 based on information received from temperature switches 445, pressure switches 450, and hot gases chemistry measuring devices 455.

The preheating unit 100 may include a body 300, where scrap 200 is loaded, and a removable cover 400, which may cover several electrical magnets 410 with working surface 415. The working surface 415 may be aligned with the path of the scrap 200 and may be approximately in line with the bottom of the cover 400. The layer of scrap 200 may be charged into the preheating unit 100 with a relatively constant height or depth such that a gap 416 is formed between the top of the scrap 200 and the bottom of the cover 400. The preheating gases can flow through the gap 416 by a negative pressure force created by fans, which are a part of a gas cleaning system 417.

Without the use of magnets, the preheating gases can flow through the preheating unit 100, but may mostly flow through the gap 416, which may efficiently preheat only the upper layer of scrap. In certain embodiments, it may be required to have an initial gap 416 between the top of loaded scrap 200 and the bottom of the cover 400. The appropriate size of the gap 416 may depend on factors including scrap content, scrap configuration, the cross section and dimensions of the preheating unit, the hot gas temperature, and the amount of available negative pressure; the size of the gap 416 may be determined analytically or empirically. The gap 416 may provide space for some of the ferromagnetic scrap to be raised, providing a path for hot gases to flow between an upper portion and a lower portion of scrap.

Figure 2:
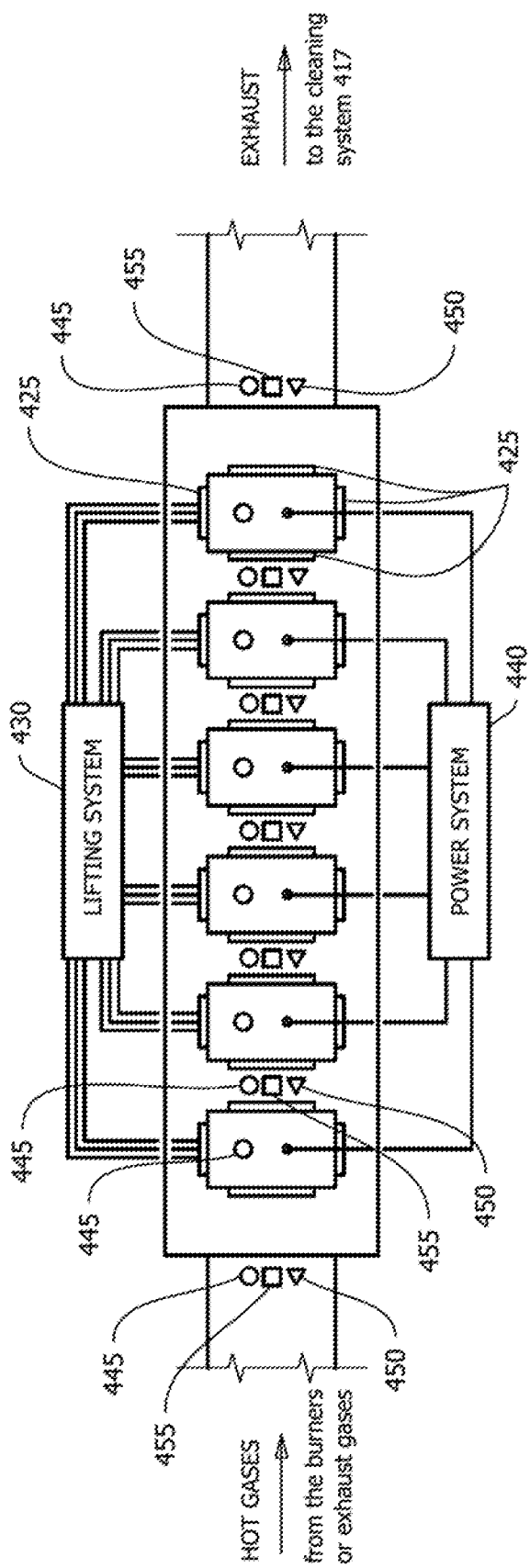
FIG. 2 depicts a plan view of a preheating unit for preheating scrap, according to some embodiments of the present invention.

In some embodiments, the electrical magnets 410 may be positioned on the cover 400 by guides 425 and may be operated by a lifting system 430 (an example of which is shown in FIG. 2) and lifting devices 435. The lifting system 430 may include lifting devices 435, which can lower the electrical magnets individually, by groups, or all together in order to contact the scrap 200 (as shown in the transition from FIG. 3A to FIG. 3B). Some embodiments may include one or more magnets without a lifting system 430 such that the electrical magnets 410 are maintained at a certain height above the bottom of the preheating unit 100. For example, in some embodiments, one or more electrical magnets 410 may be positioned at or near the cover 400 of the preheating unit 100. In embodiments without a lifting system 430, the electrical magnets 410 may be energized to create magnetic force, which may then attract and lift some or all of the ferromagnetic scrap 200 below (or otherwise near) the electrical magnets 410. In some embodiments, the electrical magnets 410 may be stationary in a lateral sense. In certain embodiments, the electrical magnets 420 may be stationary in a vertical sense. In some embodiments, the electrical magnets may be completely stationary.

Figure 3A:
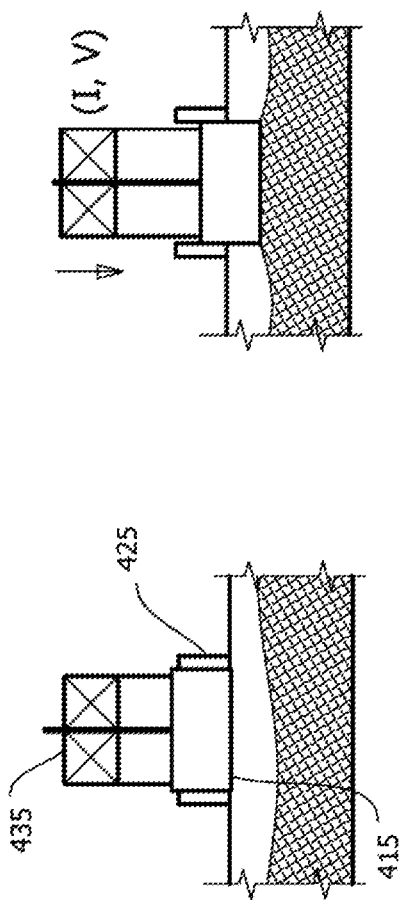
FIG. 3A depicts a section view of a magnet operation during a scrap preheating process at a time when scrap is resting on the bottom of a preheating unit, according to some embodiments of the present invention.
Figure 3B:
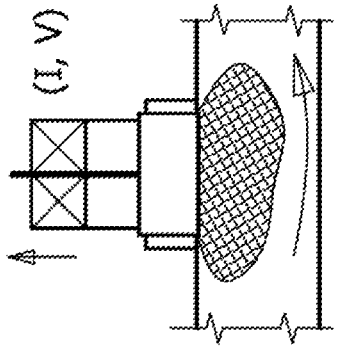
FIG. 3B depicts a section view of a magnet operation during a scrap preheating process at a time when a magnet is lowered to contact scrap, according to some embodiments of the present invention.
Figure 3C:
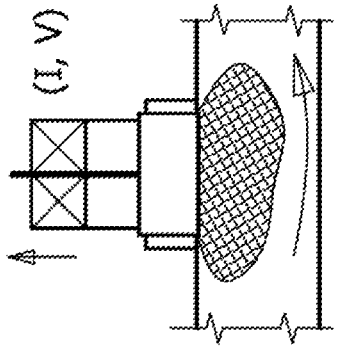
FIG. 3C depicts a section view of a magnet operation during a scrap preheating process at a time when a magnet raises an upper portion of scrap to create a gap between the upper portion of scrap and a lower portion of scrap, according to some embodiments of the present invention.
Figure 3D:
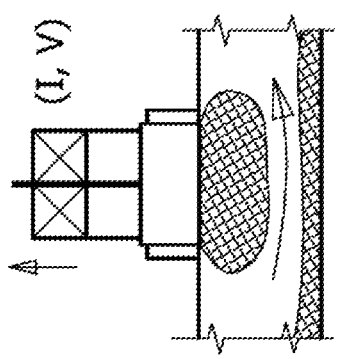
FIG. 3D depicts a section view of a magnet operation during a scrap preheating process at a time when a magnet raises an upper portion of scrap (larger than the upper portion of scrap depicted in FIG. 3C) to create a gap between the comparatively larger upper portion of scrap and a comparatively smaller lower portion of scrap, according to some embodiments of the present invention.

A power system 440 may energize the magnets to hold an upper portion of the scrap 200 with electromagnetic forces, and the lifting devices 435 may raise the upper portion of scrap 200 held by the magnets 410 to create a gap between the upper portion of scrap 200 and the lower portion of scrap 200 (see FIGS. 3C-3D). Once the upper portion of scrap had been raised up, the hot preheating gases may flow through the gap between the upper portion of scrap 200 and the lower portion of scrap 200 that is still laying at the bottom of preheating unit (see FIGS. 3C-3D and FIG. 4).

Referring in particular to FIGS. 3C and 3D, in some embodiments, each lifting device 435 may be configured to lift a predetermined amount of scrap 200 below the lifting device 435. For example, some embodiments may provide a predetermined amount of power to one or more electrical magnets of a lifting device 435, which may cause the electrical magnets to retain a predetermined amount of scrap 200. In some embodiments, one or more of the lifting devices 435 may be configured to lift approximately 5% to approximately 20% of the scrap 200 beneath the lifting device 435. For example, some lifting device 435 may be configured to lift approximately 15% of the scrap 200 beneath the lifting device 435. In some embodiments, one or more of the lifting devices 435 may be configured to lift approximately 20% to approximately 40% of the scrap 200 beneath the lifting device 435. For example, some lifting device 435 may be configured to lift approximately one-third of the scrap 200 beneath the lifting device 435. As another example, some lifting device 435 may be configured to lift approximately 25% of the scrap 200 beneath the lifting device 435. In certain embodiments, one or more of the lifting devices 435 may be configured to lift approximately 40% to approximately 60% of the scrap 200 beneath the lifting device 435. For example, some lifting device 435 may be configured to lift approximately 50% of the scrap 200 beneath the lifting device 435. In certain embodiments, one or more of the lifting devices 435 may be configured to lift approximately 60% to approximately 80% of the scrap 200 beneath the lifting device 435. For example, some lifting device 435 may be configured to lift approximately two-thirds of the scrap 200 beneath the lifting device 435. As another example, some lifting device 435 may be configured to lift approximately 75% of the scrap 200 beneath the lifting device 435. In some embodiments, one or more of the lifting devices 435 may be configured to lift approximately 80% to approximately 95% of the scrap 200 beneath the lifting device 435. For example, some lifting devices 435 may be configured to lift approximately 90% of the scrap 200 beneath the lifting device 435. In some embodiments, the lifting device may be configured to lift approximately 100% of the scrap 200 beneath the lifting device 435. The particular amount or percentage of scrap raised by the lifting devices 435 is not limited to the amounts expressly disclosed above; instead, those having skill in the art will realize that the particular percentage of scrap 200 to be lifted may be determined according to the amount of preheating desired to take place within the upper portion of scrap and/or the lower portion of scrap.

In some embodiments, all lifting devices 435 are configured to lift an approximately equal amount of scrap 200. In certain embodiments, adjacent lifting devices 435 are configured to lift different amounts of scrap. For example, in some embodiments, a first lifting device 435 may be configured to raise, for example and not limitation, approximately one-third of the scrap below the first lifting device 435, and a second lifting device 435 may be configured to raise, for example and not limitation, approximately two-thirds of the scrap below the second lifting device 435. In certain embodiments, a third lifting device 435 may be configured to raise, for example and not limitation, approximately one-third of the scrap below the first lifting device 435, and a fourth lifting device 435 may be configured to raise, for example and not limitation, approximately two-thirds of the scrap below the fourth lifting device 435, such that the lifting devices 435 follow an approximately ⅓-⅔-⅓-⅔ pattern. Such a pattern may provide a serpentine path for hot gases to flow between the upper and lower portions of scrap 200, which may allow the hot gases to contact a greater surface area of the scrap 200. This may also provide faster preheating of some or all of the scrap 200. Additionally, leaving a lower portion of scrap 200 (e.g., by not lifting all scrap below a lifting device 435) may prevent the hot gases from directly contacting at last some of the infrastructure of the tunnel, which may extend the working life of some or all parts of the tunnel infrastructure, such as the conveyer. In some embodiments, the pattern may continue to subsequent lifting devices 435. According to some embodiments, the lifting devices 435 may follow an approximately 20%-80%-20%-80% pattern, or an approximately 25%-75%-25%-75% pattern, or an approximately 40%-60%-40%-60% pattern, or any other suitable pattern.

In certain embodiments, each lifting device 435 may be configured to raise a predetermined amount of the scrap 200 located beneath the respective lifting device such that the resulting path for hot gases to flow provides an increased preheating efficiency of the scrap 200. In some embodiments, the amount of scrap 200 raised or lifted by each lifting device 435 results in path for hot gases to flow such that an optimal or a maximum preheating efficiency is achieved. According to some embodiments, the amount of scrap 200 raised or lifted by each lifting device 435 may be a predetermined amount and may be based, at least in part, on the quality and/or quantity of the scrap 200 located below one, some, or all of the lifting devices 435.

Figure 3E:
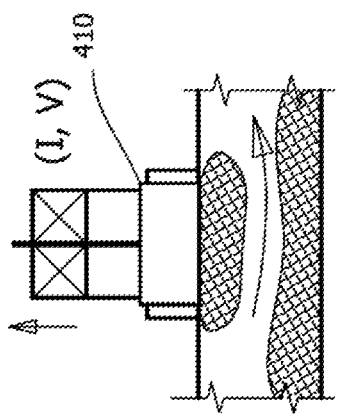
FIG. 3E depicts a section view of a magnet operation during a scrap preheating process at a time when a magnet raises substantially all of a portion of scrap to create a gap between the portion of scrap and the bottom of a preheating unit, according to some embodiments of the present invention.
Figure 4:
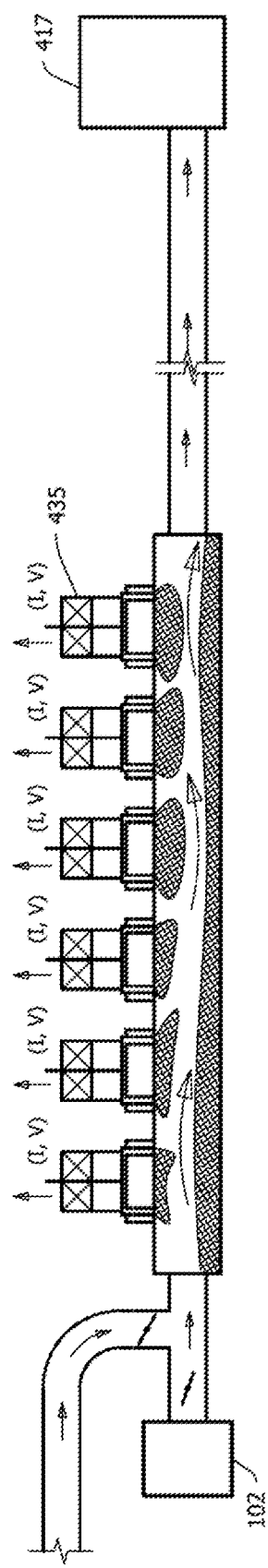
FIG. 4 depicts a section view of a preheating unit during a scrap preheating process using electrical magnets, according to some embodiments of the present invention.
Figure 5:
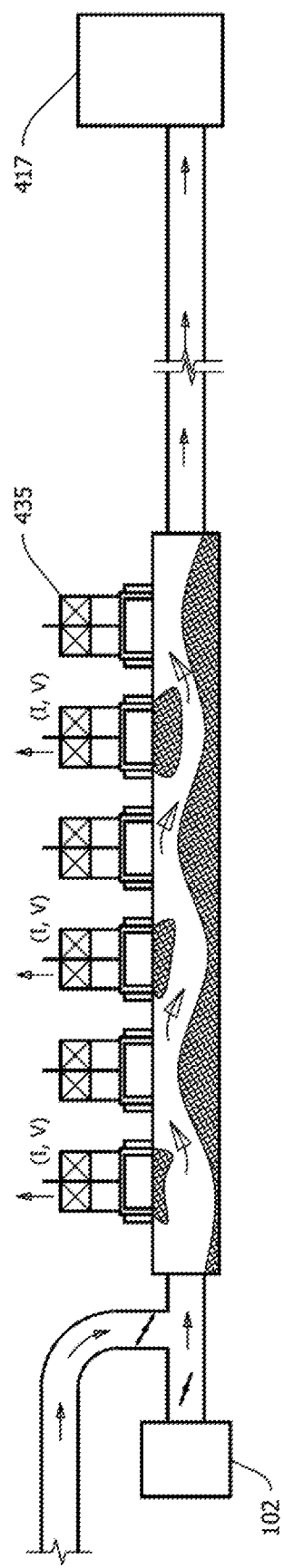
FIG. 5 depicts a section view of a preheating unit during a scrap preheating process using electrical magnets having a varied schedule, according to some embodiments of the present invention.

Referring in particular to FIG. 3E, in some embodiment, some or each lifting device 435 may be configured to lift all or substantially all of the scrap 200 located below the lifting device 435, which may be advantageous in cases when the bottom of the preheating unit made from heat accumulating material, such as refractory. Lifting all of the scrap 200 located below the lifting device 435 may also be advantageous in the event that large, heavy pieces of scrap are located at or near the bottom of the preheating unit as providing a path of hot gases at or near the large, heavy pieces of scrap may provide an increased preheating of those large, heavy pieces of scrap. Lifting all of the scrap 200 located below the lifting device 435 may also be advantageous if a relatively small amount of scrap 200 is located below the lifting device, as the additional scrap 200 retained by the lifting device 435 may provide additional protection of the magnets 410 from the hot gases. It may also be advantageous to lift all of the scrap 200 located below the lifting device 435 in the event that delays in the metallurgical operations are expected. During a delay, some or all of the scrap can be lowered to the bottom of the preheating unit, and the heat retained by the bottom of the preheating unit can be used to preheat (or maintain the temperature of) the scrap during the delay.

The symbols (I, V) included in FIGS. 3B-3E, 4, 5, and 8B-8C indicate current and voltage and are intended to show which electrical magnets are energized and producing magnetic force. To achieve more accurate control of the preheating process, the magnets 410 may be energized, and therefore hold an upper portion of scrap 200, using different sequences (see, e.g., FIG. 5). Also, the magnetic force of the electrical magnets 410 can be adjusted based on the geometry, type, and density of the ferromagnetic material loaded into the preheating unit. As described above, the amount of power may be controlled to, for example, lift a predetermined amount of scrap 200 below a lifting device 435. Control of the preheating process may be at least in part provided by temperature control devices 445, pressure switches 450 and hot gases chemistry measuring devices 455 shown in FIGS. 1 and 2.

The body of preheating unit 100 and its cover 400 could be made from different materials, which may be ferromagnetic; non-ferromagnetic; of a high thermal conductivity, such as different metals and alloys; of a high thermal resistance, such as different types of refractory; or a combination of different materials. Preheating unit 100 with cover 400 and the electrical magnets 410 may be completely or partially gas- or liquid-cooled. The cover 400, together with magnets 410, lifting system 430, and lifting devices 435, can be moved away from the preheating unit during the charging and discharging of the scrap by raising them and sliding them out on special rails, removing them with a crane, or removing them with any suitable lifting device. The magnets 410 can be designed to operate by AC or DC current. The lifting system 430, which includes individual lifting devices for each magnet or for the group of magnets, can be operated mechanically, hydraulically, or electrically.

The electrical magnets 410 can be installed on the preheating unit cover in a line, as shown in FIG. 2, in a staggered order, or in any other configuration that maximizes the heat transfer to specific type of scrap, or other preheating material, in the most efficient way. The quantity of installed electrical magnets dictates by technical requirement of installation, geometry of the preheating unit and specific requirements of preheating, as well as available volume and temperature of heating gases.

Figure 6:
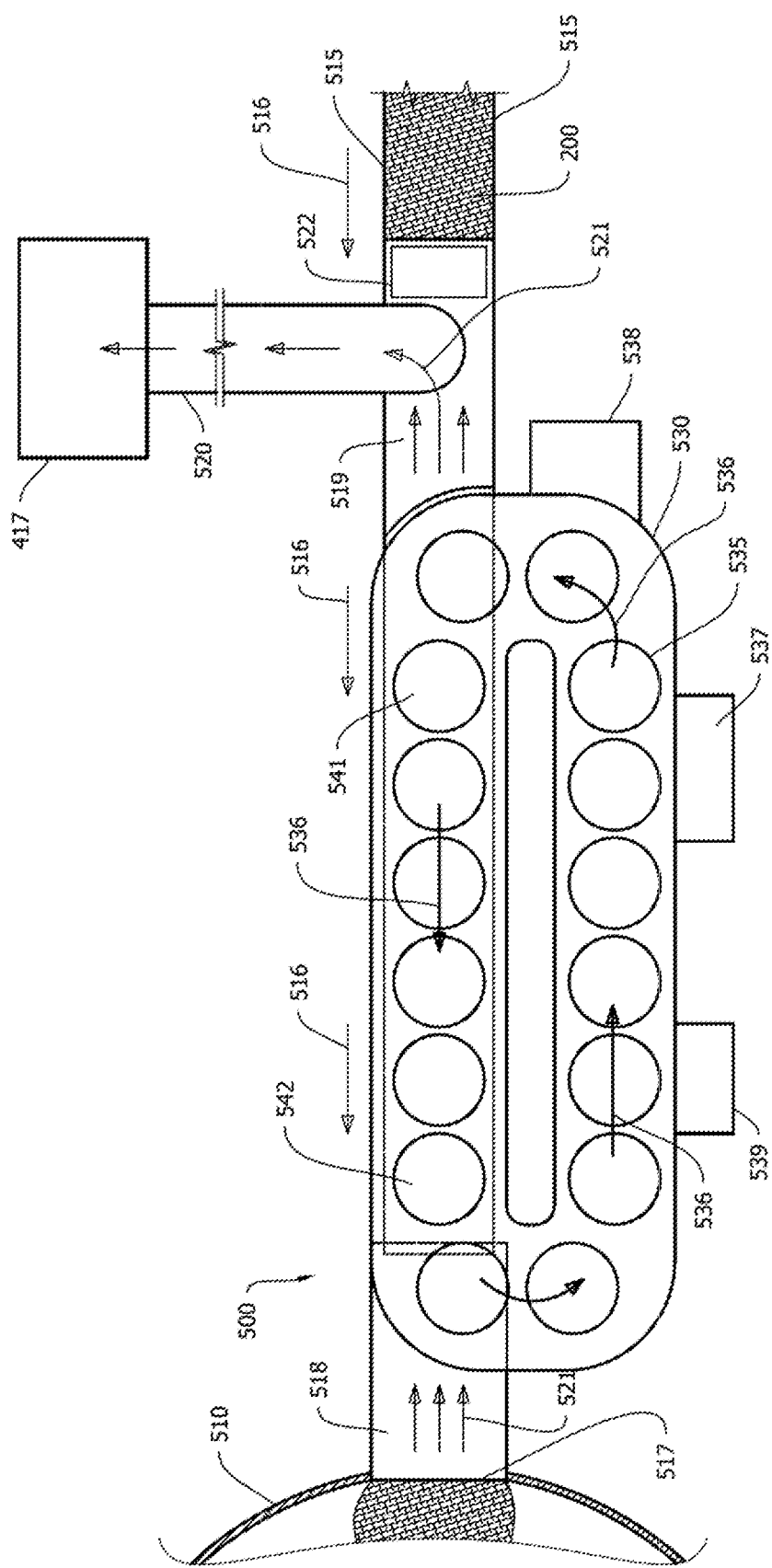
FIG. 6 depicts a layout of a scrap preheating process that transports scrap via a conveyer or similar means directly into a melting furnace, according to some embodiments of the present invention.

FIGS. 6-8 depict example embodiments in which scrap preheating is provided while scrap 200 is transported by a conveyer or similar means directly into a melting furnace, in accordance with Case 2 discussed above. In some embodiments, the electrical magnets 410 may be stationary in a lateral sense. In certain embodiments, the electrical magnets 420 may be stationary in a vertical sense. In some embodiments, the electrical magnets may be completely stationary.

Several types of melting furnaces and process vessels designed to be continuously charged with ferromagnetic scrap are herein contemplated. These include designs that allow scrap to become preheated by exhaust gases, burners, or a combination of the two as scrap is introduced into a furnace or metallurgical vessel. The pace of scrap charging and the time available for scrap preheating may depend on the melting capacity of a particular furnace and any specific requirements of the operational procedure being implemented.

Figure 7A:
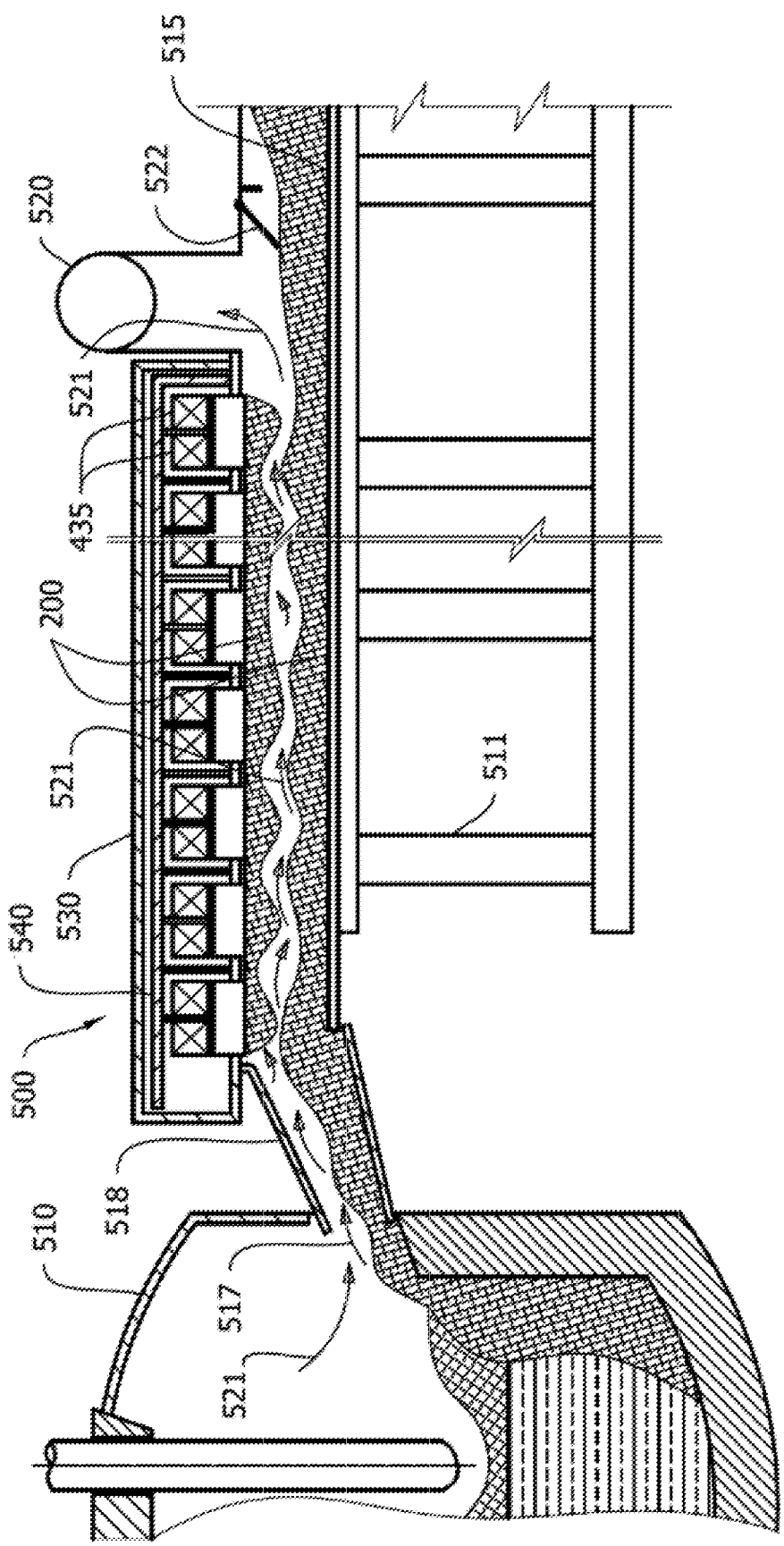
FIG. 7A depicts a section view of a scrap preheating process in which scrap is transported into a processing facility or melting furnace by a conveyer or similar means, according to some embodiments of the present invention.

FIG. 6 shows an example embodiment of a system 500 in which a scrap melting furnace 510 can receive ferromagnetic scrap 200 from a conveyer 515 installed on a structure 511 (see FIG. 7A). The direction of scrap movement is shown by arrows 516. Exhaust gases may exit the furnace 510 through the opening 517 in the direction of arrows 521, which is substantially opposite the movement of scrap 200 on the conveyer 515. In certain embodiments, the exhaust gases may travel in substantially the same direction as the scrap 200. The exhaust gases may flow through a transition piece 518, a scrap preheating portion of the conveyer 519, and a duct 520 leading toward a gas cleaning system 417. Undesirable movement of hot gases further along the conveyer can be restricted by a mechanical valve 522 or an air curtain. An Electromagnetic Scrap Preheating Unit (ESPU) 530 may be installed over the scrap preheating part of conveyer 515. The ESPU 530 may have a rotating conveyer 540 (see FIGS. 6 and 7A) with electrical magnets 535 and rotating mechanism 537. In some embodiments, the electrical magnets can be positioned on the rotating conveyer 540 along the center line of the ESPU 530 and can travel in the direction indicated by arrows 536. In some embodiments, the speed of movement the electrical magnets 535 may be equal to the speed of scrap movement by conveyer 515 and may be controlled by the rotating mechanism 537. The electrical magnets may be served by a power system 538 and a magnets lifting system 539.

Figure 8C:
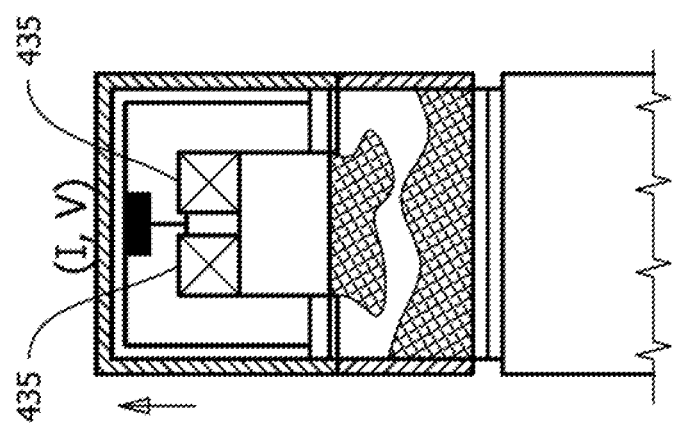
FIG. 8C depicts a section view of a magnet operation during a scrap preheating process at a time when a magnet raises an upper portion of scrap to create a gap between the upper portion of scrap and a lower portion of scrap, according to some embodiments of the present invention.
Figure 8B:
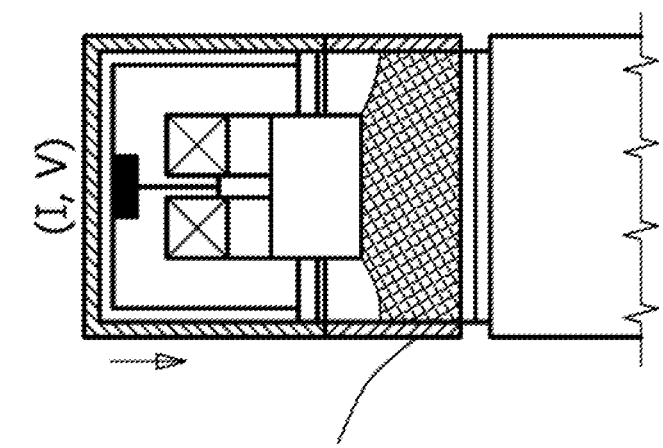
FIG. 8B depicts a section view of a magnet operation during a scrap preheating process at a time when a magnet is lowered to contact scrap, according to some embodiments of the present invention.
Figure 8A:
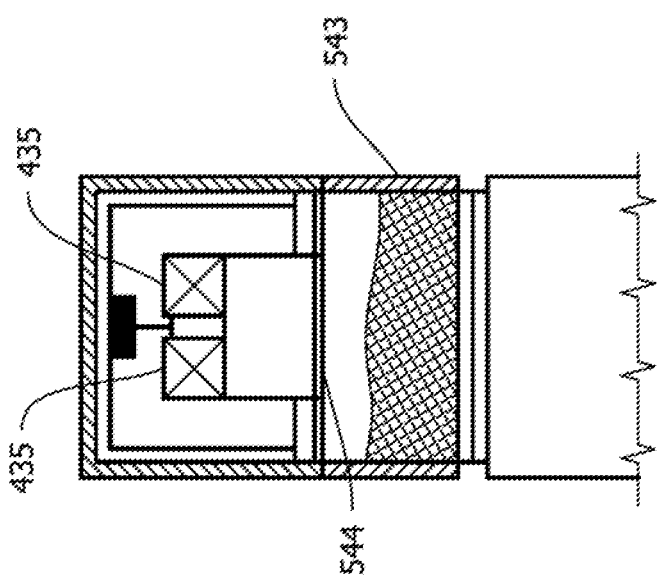
FIG. 8A depicts a section view of a magnet operation during a scrap preheating process at a time when scrap is resting on a conveyer, according to some embodiments of the present invention.

Upon reaching position 541, the electrical magnets, which were in a raised position (see FIG. 8A), can be lowered to contact the scrap 200, energized by the power system 538 (see FIG. 8B), and retracted into a raised position in which the electrical magnets can hold an upper portion of scrap by electromagnetic power (see FIG. 8C). Upon reaching position 542, the electrical magnets may then be de-energized, allowing them to release the upper portion of scrap back to the conveyer (see FIG. 8A). The initial position 541 at which the magnets are energized may also be where the magnets begin to move parallel to the path of the scrap conveyer; at position 542 the magnets may change direction and cease to move in parallel to the path of the scrap conveyer. Thus, from position 541 to position 542, the magnets can hold the upper portion of scrap and transport it collinearly with the lower portion of scrap that is transported by the conveyer before drop the scrap down at position 542. During this time, hot gases, which may include exhaust gases from the furnace and/or additional gases from burners, can move through gaps between two layers of scrap and may efficiently preheat both the upper and lower portions of scrap to the high mean temperature simultaneously. The preheating part of the conveyer may be sealed by a combination of the conveyer, side walls 543 (see FIGS. 8A-8C), the bottom of ESPU 530, and air curtains or mechanical flappers 522 located at either or both ends of the preheating part of conveyer.

FIG. 7A shows a section view of the system 500 depicted in FIG. 6 and illustrates the vertical relation between different parts of the system 500, according to some embodiments of the present invention. The conveyer 515 can receive scrap 200 from an overhead crane or other scrap charging device and can transport it toward to an opening 517 of a furnace shell 510. Hot gases 521 may pass between the upper portion of scrap 200, which is held by the electrical magnets 535, and lower parts of scrap located on the conveyer 519. The hot gases may continue to flow through the duct 520 to the gas cleaning system 417.

Figure 7B:
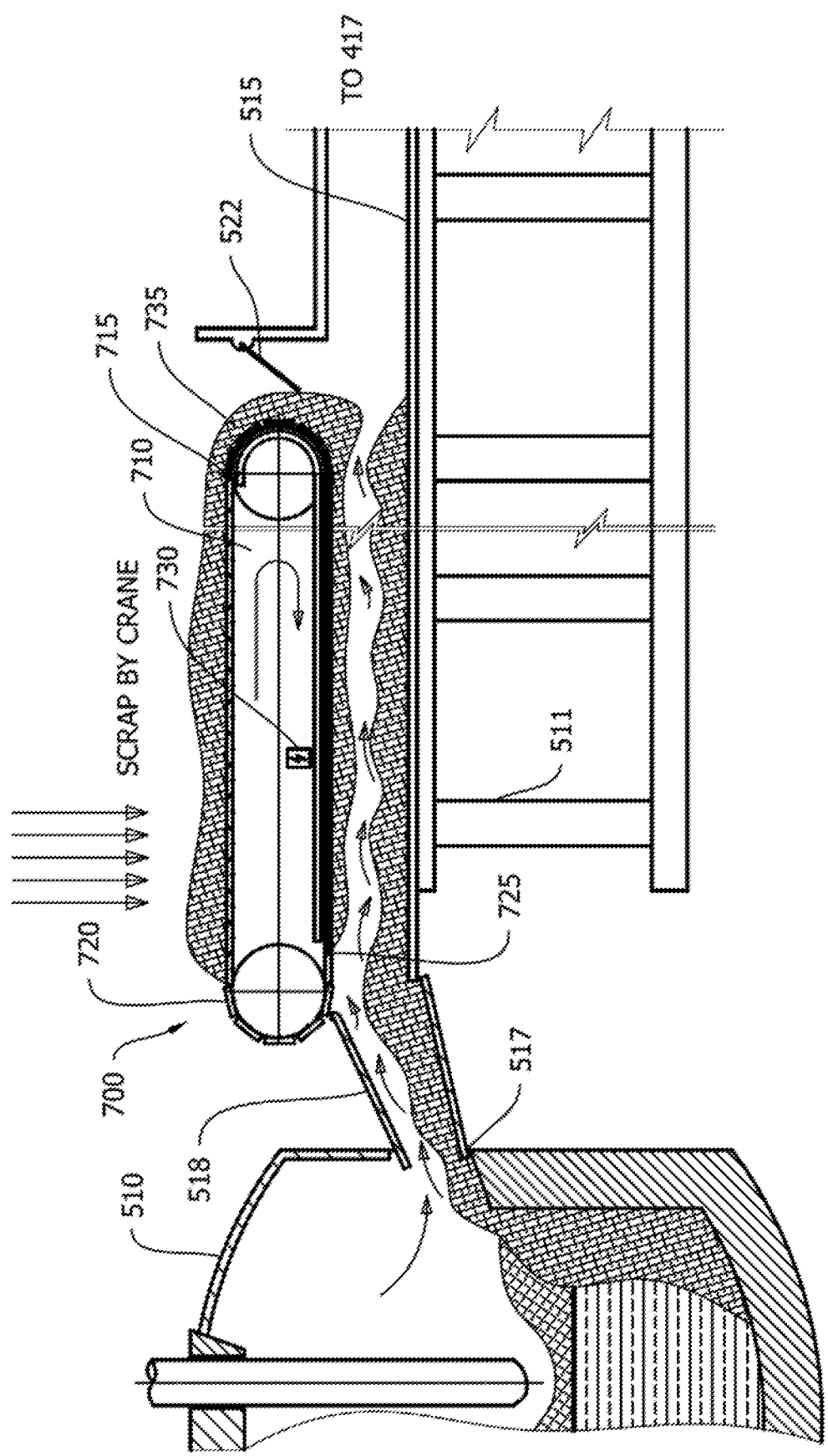
FIG. 7B depicts a section view of a scrap preheating process similar to the one depicted in FIG.7A, which uses a different type of conveyer to transport scrap directly into a processing facility, according to some embodiments of the present invention.

FIG. 7B shows an alternate system 700, according to some embodiments of the present invention. In system 700, cold scrap can be charged directly on an electrical magnet conveyer 710. The electrical magnet conveyer 710 can be configured to transport an upper portion of scrap that is held by the electrical magnets with the same linear velocity as the conveyer 515 transports a lower portion of scrap. Flat electrical magnets 720, which may be de-energized, may mechanically hold scrap on the upper horizontal portion of the conveyer 710 until position 715. At position 715, the magnets may become energized by an electrical power system 730 through an electrical bus tube 735, which may cause the magnets to hold the upper portion of scrap by magnetic force. The magnets may continue to hold the upper portion of scrap by magnetic force until position 725, at which point the magnets may become de-energized and may drop the scrap on the conveyer 515. The scrap may then be moved to the furnace opening 517 by the conveyer 515 or by the force of gravity. The system 700 may provide a scrap charging system that is compact and simple and saves a significant amount of space in a meltshop.

Figure 9:
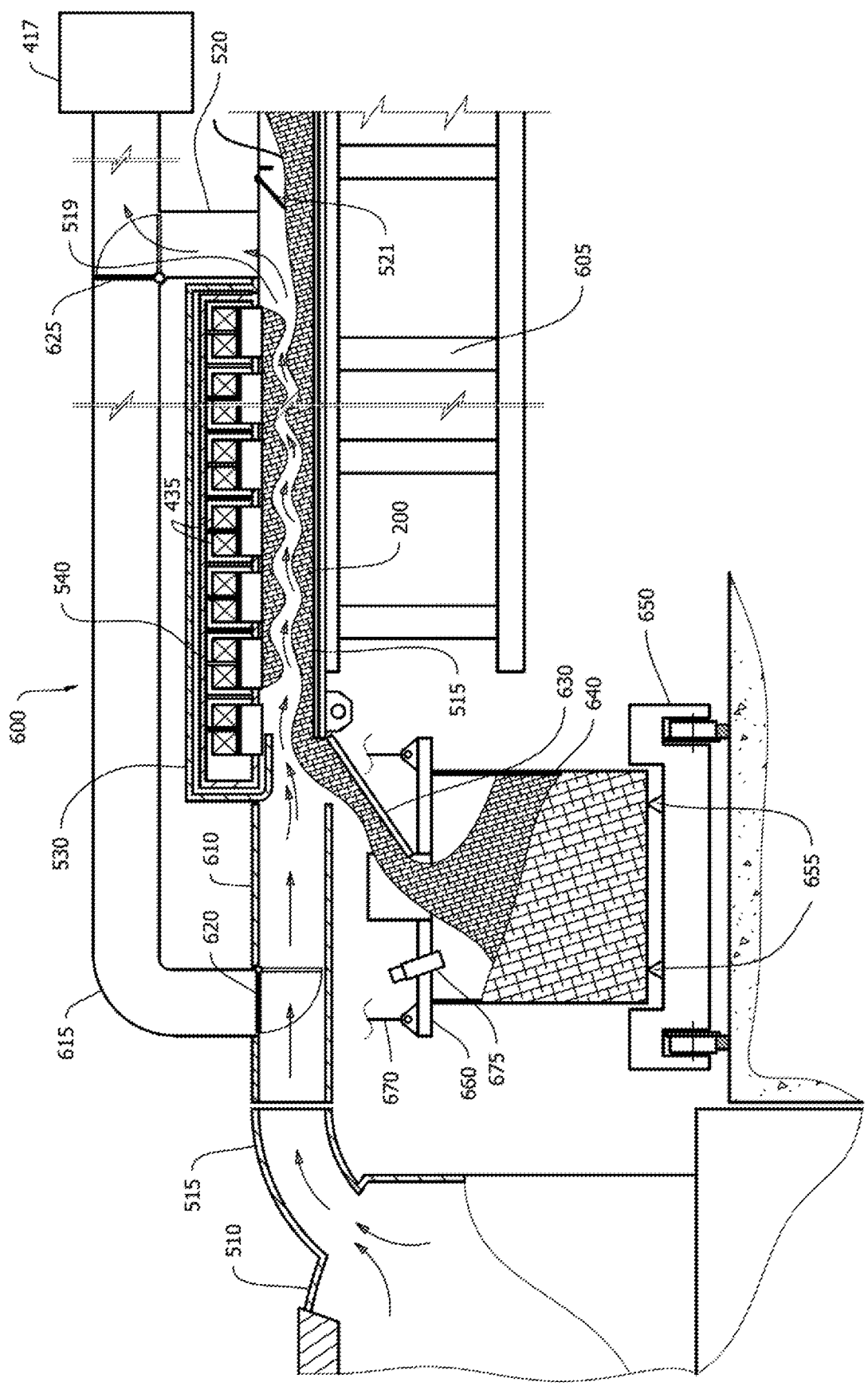
FIG. 9 depicts a section view of a scrap preheating process in which scrap is transported by a conveyer or similar means into a stationary transition vessel and charged into a processing facility or melting furnace, according to some embodiments of the present invention.

FIG. 9 shows a section view of system 600, according to some embodiments of the present invention. In system 600, preheating of ferromagnetic scrap may be achieved while the scrap is transported by a conveyer 515 into a stationary transition vessel 640. The scrap may then be charged into a processing facility or melting furnace, for instance in accordance with Case 3 as discussed above.

The ability of various embodiments of the present invention to preheat ferromagnetic scrap for a furnace that is continuously charged by a scrap conveyer has been discussed above in Case 2. Various embodiments may also be configured to preheat ferromagnetic scrap for metallurgical applications configured to batch charge scrap into a furnace during the melting operations. Batch charging is the more traditional method of charging and may be more widely used today. This method may put less restriction on the shapes of different parts of scrap and may allow the use of scrap having various shapes and densities for steel-making operations.

The volume of steel produced from scrap has dramatically increased during the last several decades, and more efforts have been made to increase the efficiency of the melting process. This is especially true for the production of ferromagnetic material, such as various grades of steel, where cost of production and final product quality strongly depends on scrap chemistry, the shape of scrap, and the cost of scrap melting. Therefore, many metallurgical furnaces, such as EAF, may currently use higher quality and better prepared ferromagnetic scrap for melting. This trend may provide increased opportunities to efficiently preheat ferromagnetic scrap before charging it into a furnace, and a common option to preheat scrap is to preheat it on a moving conveyer by hot exhaust gases, burners, or a combination of the two while the scrap is transported on the conveyer, and then charging the preheated scrap into a transition vessel. This may allow for significant increases in the energy stored in the preheated scrap by preheating it more uniformly and increasing the mean temperature of the scrap without overheating it.

Ferromagnetic scrap may be preheated during its movement on a preheating part of the conveyer, accumulated in a charging vessel, and batch charged into a melting furnace or process vessel. System 600 shows a melting furnace 510 with an elbow 515 to direct exiting exhaust gases into a duct 610. The duct 610 may be connected with a conveyer 515 installed on a structure 605 and may direct hot exhaust gases into the preheating part of conveyer 519 on top of which an Electromagnetic Scrap Preheating Unit (ESPU) 530 is installed. The exhaust gases may further travel through the duct 520 to a gas cleaning system 417. The design and functionality of the ESPU may be the same as described above. The hot gases can be sent directly to the gas cleaning system 417 using a bypass duct 615. To direct the gases through the bypass duct 615, flapper valves 620 and 625 may close ducts 610 and 520. Scrap 200 may be preheated on the conveyer and transported via a transition piece 630 to load a transition vessel 640, which may be installed on a moving car 650. The moving car 650 may have load cells 655 to monitor and control the total weight of scrap charged from the scrap conveyer 515 into the transition vessel 640. The transition vessel 640 may have a cover 660, which may be lifted up by a lifting mechanism 670 when the transition vessel 640 is moved from a charging position to be discharged into the furnace by an overhead crane. The transition vessel 640 can be heat-resisted with refractory lining, and the cover 660 can also include refractory lining and/or be cooled by water or other cooling means. If additional preheating is required while the scrap is inside the transition vessel 640, one or more burners 675 can be used.

What is claimed is:

1. A system for preheating ferromagnetic scrap comprising:
    a preheating unit configured to hold ferromagnetic scrap and to receive hot gases, the preheating unit comprising:
    a scrap conveyor configured to transport ferromagnetic scrap; and
    a magnet conveyor including a plurality of electrical magnets, each of the plurality of electrical magnets being configured to hold a respective raised quantity of ferromagnetic scrap at a height above the ferromagnetic scrap on the scrap conveyor such that at least some of the hot gases can pass below the respective raised quantity of ferromagnetic scrap,
    wherein the magnet conveyor is configured to move along a revolving path that includes:
        a scrap-transport section that is collinearly aligned with the scrap conveyor, wherein the magnet conveyor is configured to move through the scrap-transport section of the revolving path in a shared direction with the scrap conveyor;
        a diverging section in which the magnet conveyor is configured to move in a direction that diverges from the shared direction;
        a converging section in which the magnet conveyor is configured to move in a direction that converges with the shared direction; and
        a return section positioned between the diverging section and the converging section; and
    an electrical control system configured to operate the scrap conveyor and the magnet conveyor.

2. The system of claim 1 further comprising a plurality of lifting devices, each lifting device configured to lower and raise a respective electrical magnet of the plurality of electrical magnets.

3. A system for preheating ferromagnetic scrap comprising:
- a preheating unit configured to hold ferromagnetic scrap and to receive hot gases;
- a first electrical magnet configured to hold a first quantity of ferromagnetic scrap in the preheating unit such that at least some of the hot gases can pass below the first quantity of ferromagnetic scrap;
- a second electrical magnet configured to hold a second quantity of ferromagnetic scrap in the preheating unit such that at least some of the hot gases can pass below the second quantity of ferromagnetic scrap;
- an electrical control system configured to operate the first electrical magnet to hold the first quantity of ferromagnetic scrap and the second electrical magnet to hold the second quantity of ferromagnetic scrap;
- a first lifting device configured to lower and raise the first electrical magnet and a second lifting device configured to lower and raise the second electrical magnet; and
- a first guide configured to direct the first electrical magnet in a predetermined path as the first electrical magnet is moved by the first lifting device and a second guide configured to direct the second electrical magnet in a predetermined path as the second electrical magnet is moved by the second lifting device.

4. The system of claim 1 further comprising a cover disposed proximate a top of the preheating unit, the cover being removable and configured to at least partially envelop the plurality of electrical magnets.

5. The system of claim 1 further comprising a hot gases cleaning system fluidly connected to the preheating unit.

6. The system of claim 1 further comprising a process control system that is configured to control a respective magnitude of magnetic force provided by each of the plurality of electrical magnets and a respective time period at which each respective magnitude of magnetic force is provided.

7. The system of claim 1 further comprising a power system configured to provide electrical power to the plurality of electrical magnets.

8. The system of claim 6, wherein
the process control system is configured to control a number and sequence of the plurality of electrical magnets that is simultaneously energized.

9. The system of claim 1, wherein a first electrical magnet of the plurality of electrical magnets is configured to hold a first raised quantity of ferromagnetic scrap that is in the range of approximately 10% to approximately 30% of the ferromagnetic scrap located below the first electrical magnet and a second electrical magnet of the plurality of electrical magnets is configured to hold a second raised quantity of ferromagnetic scrap that is in the range of approximately 70% to approximately 90% of the ferromagnetic scrap located below the second electrical magnet.

10. The system of claim 1, wherein a first electrical magnet of the plurality of electrical magnets is configured to hold a first raised quantity of ferromagnetic scrap that is in the range of approximately 30% to approximately 49% of the ferromagnetic scrap located below the first electrical magnet and a second electrical magnet of the plurality of electrical magnets is configured to hold a second raised quantity of ferromagnetic scrap that is in the range of approximately 51% to approximately 70% of the ferromagnetic scrap located below the second electrical magnet.

11. The system of claim 1, wherein the magnet conveyer is configured to move at approximately the same linear velocity as that of the scrap conveyer.

12. A method for preheating ferromagnetic scrap comprising:
- lifting a raised portion of ferromagnetic scrap with an electrical magnet, such that a gap is created between the raised portion of ferromagnetic scrap and a remaining portion of ferromagnetic scrap, wherein the raised portion of ferromagnetic scrap and the remaining portion of ferromagnetic scrap combine to form a total amount of ferromagnetic scrap, the total amount of ferromagnetic scrap being approximately 100% of any ferromagnetic scrap located below the electrical magnet;
- transporting the raised portion of ferromagnetic scrap and the remaining portion of ferromagnetic scrap along a preheating path within a preheating tunnel such that the gap is maintained as the raised portion of ferromagnetic scrap and the remaining portion of ferromagnetic scrap are moved along the preheating path;
- directing hot gases through the preheating tunnel, such that the hot gases pass through the gap between the raised and remaining portions of ferromagnetic scrap;
- diverging the electrical magnet from the preheating path to a return path that is linearly offset from the preheating path and is in the opposite direction from preheating path; and
- diverging the electrical magnet from the return path to re-converge with the preheating path.

13. The method of claim 12, wherein the raised portion of ferromagnetic scrap is a first raised portion of ferromagnetic scrap, the remaining portion of ferromagnetic scrap is a first remaining portion of ferromagnetic scrap, the total amount of ferromagnetic scrap is a first total amount of ferromagnetic scrap, and the electrical magnet is a first electrical magnet, and
wherein the method further comprises lifting a second raised portion of ferromagnetic scrap with a second electrical magnet, such that the gap continues between the second raised portion of ferromagnetic scrap and a second remaining portion of ferromagnetic scrap, wherein the second raised portion of ferromagnetic scrap and the second remaining portion of ferromagnetic scrap combine to form a second total amount of ferromagnetic scrap, the second total amount of ferromagnetic scrap being approximately 100% of any ferromagnetic scrap located below the second electrical magnet.

14. The method of claim 13, wherein first raised portion of ferromagnetic scrap is approximately equal to the second raised portion of ferromagnetic scrap.

15. The method of claim 13, wherein first raised portion of ferromagnetic scrap is larger than the second raised portion of ferromagnetic scrap.

16. The method of claim 15, wherein the first raised portion of ferromagnetic scrap is in the range of approximately 70% to approximately 90% of the ferromagnetic scrap located below the first electrical magnet and the second raised portion of ferromagnetic scrap is in the range of approximately 10% to approximately 30% of the ferromagnetic scrap located below the second electrical magnet.

17. The method of claim 15, wherein the first raised portion of ferromagnetic scrap is in the range of approximately 51% to approximately 70% of the ferromagnetic scrap located below the first electrical magnet and the second raised portion of ferromagnetic scrap is in the range of approximately 30% to approximately 49% of the ferromagnetic scrap located below the second electrical magnet.

18. The method of claim 12, wherein the electrical magnet is an electric magnet of a plurality of electrical magnets, and wherein lifting the raised portion of ferromagnetic scrap with the electrical magnet comprises lifting, with each odd-numbered electrical magnet of the plurality of electrical magnets, ferromagnetic scrap in the range of approximately 10% to approximately 30% of any ferromagnetic scrap located below each respective odd-numbered electrical magnet of the plurality of electrical magnets and lifting, with each even-numbered electrical magnet of the plurality of electrical magnets, ferromagnetic scrap in the range of approximately 70% to approximately 90% of any ferromagnetic scrap located below each respective even-numbered electrical magnet of the plurality of electrical magnets, such that a serpentine gap is created.

19. The method of claim 12, wherein the electrical magnet is an electric magnet of a plurality of electrical magnets, and wherein lifting the raised portion of ferromagnetic scrap with the electrical magnet comprises lifting, with each odd-numbered electrical magnet of the plurality of electrical magnets, ferromagnetic scrap in the range of approximately 30% to approximately 50% of any ferromagnetic scrap located below each respective odd-numbered electrical magnet of the plurality of electrical magnets and lifting, with each even-numbered electrical magnet of the plurality of electrical magnets, ferromagnetic scrap in the range of approximately 50% to approximately 70% of any ferromagnetic scrap located below each respective even-numbered electrical magnet of the plurality of electrical magnets, such that a serpentine gap is created.

20. The method of claim 12, wherein the raised portion of ferromagnetic scrap is a predetermined amount of ferromagnetic scrap, the predetermined amount being based at least in part on a quality and/or a quantity of any ferromagnetic scrap located below the electrical magnet.

21. The system of claim 1, wherein the return section is approximately parallel to the scrap-transport section.

22. The system of claim 21, wherein the magnet conveyor is configured to move along the revolving path at a substantially constant height.

23. The system of claim 21, wherein the magnet conveyor is configured to have a first height when the magnet conveyor moves through the scrap-transport section and second height when the magnet conveyor moves through the return section, the second height being greater than the first height.

24. The system of claim 23, wherein:
the magnet conveyor is configured to receive the ferromagnetic scrap within the return section; and
as the magnet conveyor moves through the converging section, the plurality of electrical magnets within the converging section is configured to be energized to hold the respective raised quantity of ferromagnetic scrap, at least some of the ferromagnetic scrap falling from the magnet conveyor and onto the scrap conveyor.

* * * * *